Patented Oct. 12, 1937

2,095,778

UNITED STATES PATENT OFFICE 2,095,778

SULPHONATED DERIVATIVES OF ANIMAL AND VEGETABLE WAXES

Ralph Wechsler, Hillside, and Ernest Segessemann, Newark, N. J., assignors to National Oil Products Company, Harrison, N. J., a corporation of New Jersey No Drawing. Application October 9, 1936, Serial No. 104,778

22 Claims. (Cl. 260—99.12)

Our invention is concerned with the production of new sulphonated derivatives of naturally-occurring animal and vegetable waxes in a novel and advantageous manner.

Waxes such as wool fat, beeswax, sperm oil, etc., have long been known to possess advantageous properties after treatment with sulphonating reagents such as sulphuric acid or chlorosulphonic acid. The sulphated derivatives have been used as wetting, emulsifying and finishing agents on such materials as textiles, leather, paper, etc.

We have now found that the desirable properties of the above materials, for use in the industries mentioned, are greatly enhanced if, instead of treating the waxes themselves with sulphonating agents, we sulphonate derivatives produced by alcoholysis of these waxes with low molecular weight alcohols containing one or more tertiary carbon atoms of the type linked to three other carbon atoms, as for example isobutyl alcohol, isoamyl alcohol, 2-ethyl butanol, 3-methyl pentanol, etc. We have further found that the added benefits and efficiency noted in the use of these sulphonated derivatives is due to the simultaneous treatment, with sulphonating agents, of the components of the composition of matter thus produced, presumably consisting mainly of fatty alcohols and low molecular weight alcohol esters of the wax fatty acids in close association with each other, in which treatment a true sulphonic group is introduced by substitution of the hydrogen atom at the tertiary carbon atom of the low molecular weight alcohol radical. The production of both sulphated and sulphonated derivatives in this manner yields products which are greatly effective as dyeing and finishing assistants in textile operations. The emulsifying and wetting-out properties of these products, as well as their stability in the presence of acids, are also greater than is the case for the sulphated waxes themselves, or for derivatives which do not contain a tertiary carbon atom of the type linked to three other carbon atoms.

The alcoholysis of the wax with alcohols of the type mentioned is preferably carried out in the presence of catalysts, as for example hydrogen chloride or other mineral acids, which speed up the reaction and help carry it to completion.

The following examples are given simply to illustrate the production of our new composition of matter, and it is understood that other waxes or alcohols of the types mentioned can be used with equivalent results. All parts are by weight.

Example #1

100 parts of sperm oil and 23 parts of isobutyl alcohol are introduced into a steam-jacketed closed kettle, which is provided with an air-cooled reflux condenser. Dry hydrogen chloride is then passed through the mixture until its weight has increased by 2 parts. This mixture is well agitated and heated to 90° C. for 10 hours. At the end of this period the reaction products, which presumably consist of the fatty alcohols of sperm oil and the isobutyl ester of sperm oil fatty acids, are sulphonated with 60 parts of 66° Bé. sulphuric acid. The temperature of sulphonation is kept at 30° C. for 6 hours. The mass is then dropped into 300 parts of a 10% common salt solution, agitated and then allowed to separate. The separated water layer is then drawn off and the supernatant sulphonated product is neutralized with caustic soda.

Example #2

A steam-jacketed closed kettle, provided with an air-cooled reflux condenser, is charged with 100 parts of beeswax, 16 parts of isoamyl alcohol and 3 parts of phosphoric acid of 85% strength. The mixture is heated to 90° C. and well agitated for 24 hours. The products of reaction, presumably consisting chiefly of miricyl alcohol and isoamyl palmitate, are then sulphonated with 100 parts of fuming sulphuric acid, keeping the temperature at 40° C. for 3 hours. The mass is then washed and neutralized as described in Example #1.

Example #3

100 parts of commercial wool wax and 18 parts of 2-ethyl butanol are heated with 3 parts of sulphuric acid for 48 hours at 90° C. The mass is then sulphonated with 100 parts of chlorosulphonic acid, keeping the temperature at 30° C. for 4 hours. The sulphonated product is then washed and neutralized in the usual manner.

Example #4

100 parts of cottonseed wax and 27 parts of isoamyl alcohol are heated together with 2.5 parts of sulphuric acid at 105° C. for 8 hours. The reaction products are then sulphonated with 127 parts of 100% sulphuric acid at 40° C. for 6 hours. The mass is then washed and neutralized as indicated in previous examples.

In applying the material to dyeing operations, as an example of its usefulness in the textile field, one can proceed as follows:

Viscose filled acetate warp fabrics are wet out in warm water containing 2 to 3% of the product obtained under Example 1, plus 1% soda ash. The color is then added and the temperature raised to boiling. An exceptionally level dyeing results, and the penetration of the color in the folds is greatly improved.

In finishing operations on rayon fabrics, the product of Example 3 will give excellent softening effect with as little as 3 quarts to 25 gallons of water on the quetch. These proportions may be varied, of course, to suit various requirements, but the goods will not feel sticky or develop rancid odors even when an increased proportion of the material is used.

The products also give desirable properties when used in the treatment of silk, cotton, wool and other fibers, alone or mixed with other materials.

Among the low molecular weight alcohols of the type mentioned, and suitable for our process, we prefer to use alcohols of the aliphatic series containing not more than eight carbon atoms in the molecule, as these are more readily available commercially and therefore lead to a cheaper product having a maximum of the desirable qualities sought for in the sulphonated derivatives.

The waxes which we may use are naturally-occurring waxes of the ester type, as for example waxes which consist mainly of the esters of high molecular weight fatty alcohols with fatty acids. These waxes may be liquid or solid, and of vegetable or animal origin, as for example carnauba wax, candelilla wax, cottonseed wax, spermaceti, wool fat, beeswax, sperm oil, etc.

It is to be understood that our invention is not limited to the specific embodiments herein disclosed, but that it includes all modifications as to procedure and all equivalent materials coming within the scope of the claims and specification.

What we claim is:

1. The process which comprises the steps of alcoholysis of a wax selected from the group consisting of animal and vegetable waxes with an aliphatic alcohol having not more than eight carbon atoms, at least one of which being a tertiary carbon atom of the type linked to three other carbon atoms and a hydrogen atom, and treatment of the resulting mixture with a sulphonating agent.

2. The process which comprises the steps of alcoholysis, in the presence of a catalyst, of a wax selected from the group consisting of animal and vegetable waxes with an aliphatic alcohol having not more than eight carbon atoms, at least one of which being a tertiary carbon atom of the type linked to three other carbon atoms and a hydrogen atom, and treatment of the resulting mixture with a sulphonating agent.

3. The process which comprises the steps of alcoholysis, in the presence of hydrogen chloride, of a wax selected from the group consisting of animal and vegetable waxes with an aliphatic alcohol having not more than eight carbon atoms, at least one of which being a tertiary carbon atom of the type linked to three other carbon atoms and a hydrogen atom, and treatment of the resulting mixture with a sulphonating agent.

4. The process which comprises the steps of alcoholysis of a wax selected from the group consisting of animal and vegetable waxes with an aliphatic alcohol having not more than eight carbon atoms, at least one of which being a tertiary carbon atom of the type linked to three other carbon atoms and a hydrogen atom, and treatment of the resulting mixture with sulphuric acid.

5. The process which comprises the steps of alcoholysis of a wax selected from the group consisting of animal and vegetable waxes with isobutyl alcohol and treatment of the resulting mixture with a sulphonating agent.

6. The process which comprises the steps of alcoholysis of sperm oil with an aliphatic alcohol having not more than eight carbon atoms, at least one of which being a tertiary carbon atom of the type linked to three other carbon atoms and a hydrogen atom, and treatment of the resulting mixture with a sulphonating agent.

7. The process which comprises the steps of alcoholysis, in the presence of a catalyst, of sperm oil with an aliphatic alcohol having not more than eight carbon atoms, at least one of which being a tertiary carbon atom of the type linked to three other carbon atoms and a hydrogen atom, and treatment of the resulting mixture with a sulphonating agent.

8. The process which comprises the steps of alcoholysis, in the presence of a catalyst, of sperm oil with an aliphatic alcohol having not more than eight carbon atoms, at least one of which being a tertiary carbon atom of the type linked to three other carbon atoms and a hydrogen atom, and treatment of the resulting mixture with sulphuric acid.

9. The process which comprises the steps of alcoholysis, in the presence of a catalyst, of sperm oil with isobutyl alcohol and treatment of the resulting mixture with a sulphonating agent.

10. The process which comprises the steps of alcoholysis of sperm oil with isobutyl alcohol and treatment of the resulting mixture with a sulphonating agent.

11. The process which comprises the steps of alcoholysis, in the presence of hydrogen chloride, of sperm oil with isobutyl alcohol and treatment of the resulting mixture with sulphuric acid.

12. The composition of matter produced by the process of claim 1.

13. The composition of matter produced by the process of claim 2.

14. The composition of matter produced by the process of claim 3.

15. The composition of matter produced by the process of claim 4.

16. The composition of matter produced by the process of claim 5.

17. The composition of matter produced by the process of claim 6.

18. The composition of matter produced by the process of claim 7.

19. The composition of matter produced by the process of claim 8.

20. The composition of matter produced by the process of claim 9.

21. The composition of matter produced by the process of claim 10.

22. The composition of matter produced by the process of claim 11.

RALPH WECHSLER.
ERNEST SEGESSEMANN.